(12) United States Patent
Temm

(10) Patent No.: US 9,998,481 B2
(45) Date of Patent: Jun. 12, 2018

(54) SYSTEMS AND METHODS FOR USE IN SCORING ENTITIES IN CONNECTION WITH PREPAREDNESS OF THE ENTITIES FOR CYBER-ATTACKS

(71) Applicant: MASTERCARD INTERNATIONAL INCORPORATED, Purchase, NY (US)

(72) Inventor: Gregory W. Temm, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 264 days.

(21) Appl. No.: 14/856,104

(22) Filed: Sep. 16, 2015

(65) Prior Publication Data

US 2017/0078308 A1 Mar. 16, 2017

(51) Int. Cl.
*H04L 29/06* (2006.01)
*G06Q 20/40* (2012.01)

(52) U.S. Cl.
CPC ..... *H04L 63/1416* (2013.01); *G06Q 20/4016* (2013.01); *H04L 63/1408* (2013.01); *H04L 63/1425* (2013.01)

(58) Field of Classification Search
CPC ............. H04L 63/1416; H04L 63/1441; H04L 63/1408; H04L 63/1425; H04L 63/1433; G06Q 20/4016

USPC ...................................................... 726/22–25
See application file for complete search history.

(56) References Cited

U.S. PATENT DOCUMENTS

| 7,594,270 | B2* | 9/2009 | Church | G06F 21/552 726/23 |
| 8,250,654 | B1* | 8/2012 | Kennedy | H04L 41/22 713/187 |
| 8,640,234 | B2* | 1/2014 | Gassen | G06F 21/554 713/153 |
| 8,726,393 | B2* | 5/2014 | MacY | G06F 21/577 726/1 |
| 9,210,185 | B1* | 12/2015 | Pinney Wood | G06F 17/30958 |
| 9,325,728 | B1* | 4/2016 | Kennedy | H04L 63/1433 |

* cited by examiner

*Primary Examiner* — Hosuk Song
(74) *Attorney, Agent, or Firm* — Harness, Dickey & Pierce, P.L.C.

(57) ABSTRACT

Systems and methods are provided for scoring business entities for attack preparedness, for example, in connection with cyber-attaches, etc. One exemplary method includes receiving a selection of a target business entity, associated with a payment network, and then generating a preparedness score related to cyber-attack for the selected business entity based on at least one security aspect of the business entity and at least one stage of attack. The method then also includes publishing the preparedness score to a user, for example, through an interface, etc.

18 Claims, 6 Drawing Sheets

| | | REAL ESTATE & ASSETS | PEOPLE |
|---|---|---|---|
| PREVENTION | VULNERABILITY MANAGEMENT ←402 | MEASURE: ASSETS SCANNED FOR VULNERABILITIES. BENCHMARKS: 100%-66% (HIGH), 66%-33% (MEDIUM), 33%-0% (LOW) | MEASURE: ENOUGH PEOPLE ARE ALLOCATED AND TRAINED TO IDENTIFY VULNERABILITIES REGULARLY. BENCHMARKS: SUPERIOR (HIGH), ADEQUATE (MEDIUM), DEFICIT (LOW) |
| | THREAT INTELLIGENCE | MEASURE: # INTEL SOURCES REPORTING AGAINST ASSETS. BENCHMARKS: 10-7 (HIGH), 6-3 (MEDIUM), 2-0 (LOW) | MEASURE: ENOUGH PEOPLE ARE ALLOCATED AND TRAINED TO IDENTIFY THREATS AND THREAT DATA REGULARLY. BENCHMARKS: SUPERIOR (HIGH), ADEQUATE (MEDIUM), DEFICIT (LOW) |
| | SUBSIDIARY SECURITY | MEASURE: #SUBSIDIARY SECURITY ASSETS ARE INTEGRATED INTO MASTERCARD SECURITY PROGRAM. BENCHMARKS: 100%-66% (HIGH), 66%-33% (MEDIUM), 33%-0% (LOW) | MEASURE: ENOUGH PEOPLE ARE ALLOCATED AND TRAINED TO IDENTIFY SUBSIDIARY SECURITY GAPS. BENCHMARKS: SUPERIOR (HIGH), ADEQUATE (MEDIUM), DEFICIT (LOW) |
| DETECTION | EVENT MANAGEMENT | MEASURE: SECURITY ASSETS ARE REGULARLY MONITORED FOR SECURITY EVENTS: BENCHMARK: 100%-66% (HIGH), 66%-33% (MEDIUM), 33%-0% (LOW) | MEASURE: ENOUGH PEOPLE ARE ALLOCATED AND TRAINED TO MONITOR AND DETECT SECURITY EVENTS. BENCHMARKS: SUPERIOR (HIGH), ADEQUATE (MEDIUM), DEFICIT (LOW) |
| | INCIDENT MANAGEMENT | MEASURE: ASSETS ARE AVAILABLE TO COLLECT AND STORE EVIDENCE. BENCHMARK: 100%-66% (HIGH), 66%-33% (MEDIUM), 33%-0% (LOW) | MEASURE: ENOUGH PEOPLE ARE ALLOCATED AND TRAINED TO PERFORM INCIDENT MANAGEMENT. BENCHMARKS: SUPERIOR (HIGH), ADEQUATE (MEDIUM), DEFICIT (LOW) |
| RESPONSE | BUSINESS RECOVERY | MEASURE: CRITICAL SECURITY ASSETS ARE IDENTIFIED IN A BUSINESS RECOVERY PLAN. BENCHMARK: 100%-66% (HIGH), 66%-33% (MEDIUM), 33%-0% (LOW) | MEASURE: CRITICAL STAFF ARE IDENTIFIED IN A BUSINESS RECOVERY PLAN. BENCHMARKS: SUPERIOR (HIGH), ADEQUATE (MEDIUM), DEFICIT (LOW) |
| | DISASTER RECOVERY | MEASURE: CRITICAL SECURITY ASSETS ARE IDENTIFIED IN A DISASTER RECOVERY PLAN. BENCHMARK: 100%-66% (HIGH), 66%-33% (MEDIUM), 33%-0% (LOW) | MEASURE: CRITICAL STAFF ARE IDENTIFIED IN A DISASTER RECOVERY PLAN. BENCHMARKS: SUPERIOR (HIGH), ADEQUATE (MEDIUM), DEFICIT (LOW) |

| PROCESS | TECHNOLOGY |
|---|---|
| MEASURE: PROCESSES ARE DEFINED TO REGULARLY IDENTIFY VULNERABILITIES. BENCHMARK: 10-6 (HIGH), 6-3 (MEDIUM), 3-0 (LOW) | BENCHMARK: TECHNOLOGY IS AVAILABLE TO SCAN AND IDENTIFY A WIDE RANGE OF VULNERABILITIES ACROSS ASSETS. BENCHMARKS: 10-6 (HIGH), 6-3 (MEDIUM), 3-0 (LOW) |
| MEASURE: PROCESSES ARE DEFINED TO REGULARLY ANALYZE AND REPORT ON THREATS. BENCHMARKS: 10-6 (HIGH), 6-3 (MEDIUM), 3-0 (LOW) | MEASURE: TECHNOLOGY IS UTILIZED TO COLLECT, CONSOLIDATE, AND AUTOMATE THREAT INTELLIGENCE ANALYSIS. BENCHMARKS: 10-6 (HIGH), 6-3 (MEDIUM), 3-0 (LOW) |
| MEASURE: PROCESSES ARE DEFINED TO ADDRESS SUBSIDIARY SECURITY ISSUES. BENCHMARKS: 10-6 (HIGH), 6-3 (MEDIUM), 3-0 (LOW) | MEASURE: TECHNOLOGY IS UTILIZED TO IDENTIFY SECURITY EVENTS IN SUBSIDIARIES. BENCHMARKS: 10-6 (HIGH), 6-3 (MEDIUM), 3-0 (LOW) |
| MEASURE: PROCESSES ARE DEFINED TO REGULARLY MONITOR AND DETECT SECURITY EVENTS. 10-6 (HIGH), 6-3 (MEDIUM), 3-0 (LOW) | MEASURE: TECHNOLOGY TO PERFORM INCIDENT RESPONSE AND ANALYSIS IS AVAILABLE. BENCHMARKS: 10-6 (HIGH), 6-3 (MEDIUM), 3-0 (LOW) |
| MEASURE: PROCESSES ARE DEFINED TO CONDUCT AN INCIDENT RESPONSE PLAN DURING A CYBER EVENT. BENCHMARKS: 10-6 (HIGH), 6-3 (MEDIUM), 3-0 (LOW) | MEASURE: TECHNOLOGY TO PERFORM INCIDENT RESPONSE AND ANALYSIS IS AVAILABLE. BENCHMARK: 10-6 (HIGH), 6-3 (MEDIUM), 3-0 (LOW) |
| MEASURE: PROCESSES ARE DEFINED TO IMPLEMENT RECOVERY PLANS DURING AN APPLICABLE CYBER EVENT. BENCHMARKS: 10-6 (HIGH), 6-3 (MEDIUM), 3-0 (LOW) | MEASURE: LAPTOPS, FILESHARES, TELECOM SOLUTIONS ARE AVAILABLE IN BUSINESS RECOVERY MODE DURING AN APPLICABLE CYBER EVENT. BENCHMARKS: 10-6 (HIGH), 6-3 (MEDIUM), 3-0 (LOW) |
| MEASURE: PROCESSES ARE DEFINED TO A DR FACILITY DURING AN APPLICABLE CYBER EVENT. BENCHMARKS: 10-6 (HIGH), 6-3 (MEDIUM), 3-0 (LOW) | MEASURE: MONITORING TOOLS/SERVERS/ APPLICATIONS ARE AVAILABLE IN DISASTER RECOVERY MODE DURING APPLICABLE CYBER EVENT. BENCHMARKS: 10-6 (HIGH), 6-3 (MEDIUM), 3-0 (LOW) |

FROM FIG. 4A

FIG. 4B

SYSTEMS AND METHODS FOR USE IN SCORING ENTITIES IN CONNECTION WITH PREPAREDNESS OF THE ENTITIES FOR CYBER-ATTACKS

FIELD

The present disclosure generally relates to systems and methods for scoring entities for attack preparedness (e.g., for preparedness against cyber-attacks, etc.). More particularly, the systems and methods relate to generating one or more scores, for a business entity associated with (or under consideration to be associated with) a payment network, based on multiple security aspects for the business entity, whereby the one or more scores are indicative of the business entity's preparedness for attacks (e.g., cyber-attacks, etc.) to access and/or interfere with the business entity and/or payment network.

BACKGROUND

This section provides background information related to the present disclosure which is not necessarily prior art.

Payment networks permit purchase transactions for products and services through use of payment accounts. In addition to purchase transactions, the payment networks also provide a variety of services to consumers and partners that, in some instances, rely on data generated during the purchase transactions, i.e., transaction data. Because the payment networks may span wide geographic regions, they may consist of a variety of different physical or virtual locations, which may be different divisions or associated businesses of the payment networks, or which may be business partners of the payment networks.

Separately, the payment networks are subject to a variety of requirements and/or standards, which relate to data integrity, security and/or redundancy. As the payment networks are segmented across geographic regions, their divisions, associated businesses, and partners are also often subjected to one or more of the same requirements and/or standards, in order to access the payment networks.

DRAWINGS

The drawings described herein are for illustrative purposes only of selected embodiments and not all possible implementations, and are not intended to limit the scope of the present disclosure.

FIGS. 4A-4B illustrate a matrix, including exemplary rules and/or scales, which may be used in the system of FIG. 1 and/or method of FIG. 3, to generate the preparedness score.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Payment networks are often separated by location, services, or other factors, into various business entities, or parts. Businesses entities associated with the payment network, often regardless of their particular roles in the payment networks, present potential points of attack for unauthorized users and/or entities to gain access to data included in the payment networks. To enhance security at the business entities, different standards and/or requirements may be dictated by the payment networks, in order for the business entities to prevent, detect and/or respond to such attacks, if they occur. The systems and methods herein assign preparedness scores to business entities associated with a payment network, based on different aspects of the business entities, whereby vulnerability of the business entities may be assessed and/or determined. In particular, for each business entity, scores may be generated for prevention of, detection of and response to attacks, often from partial scores based on one or more aspects of the business entity. The partial scores are combined, and may be further weighted based on importance, to yield the preparedness score. In this manner, security measures employed at the business entity, across different stages and aspects thereof, can be evaluated to determine preparedness of the business entity for attacks (e.g., cyber-attacks, etc.) against the business entity and/or associated payment network.

Figure 1:
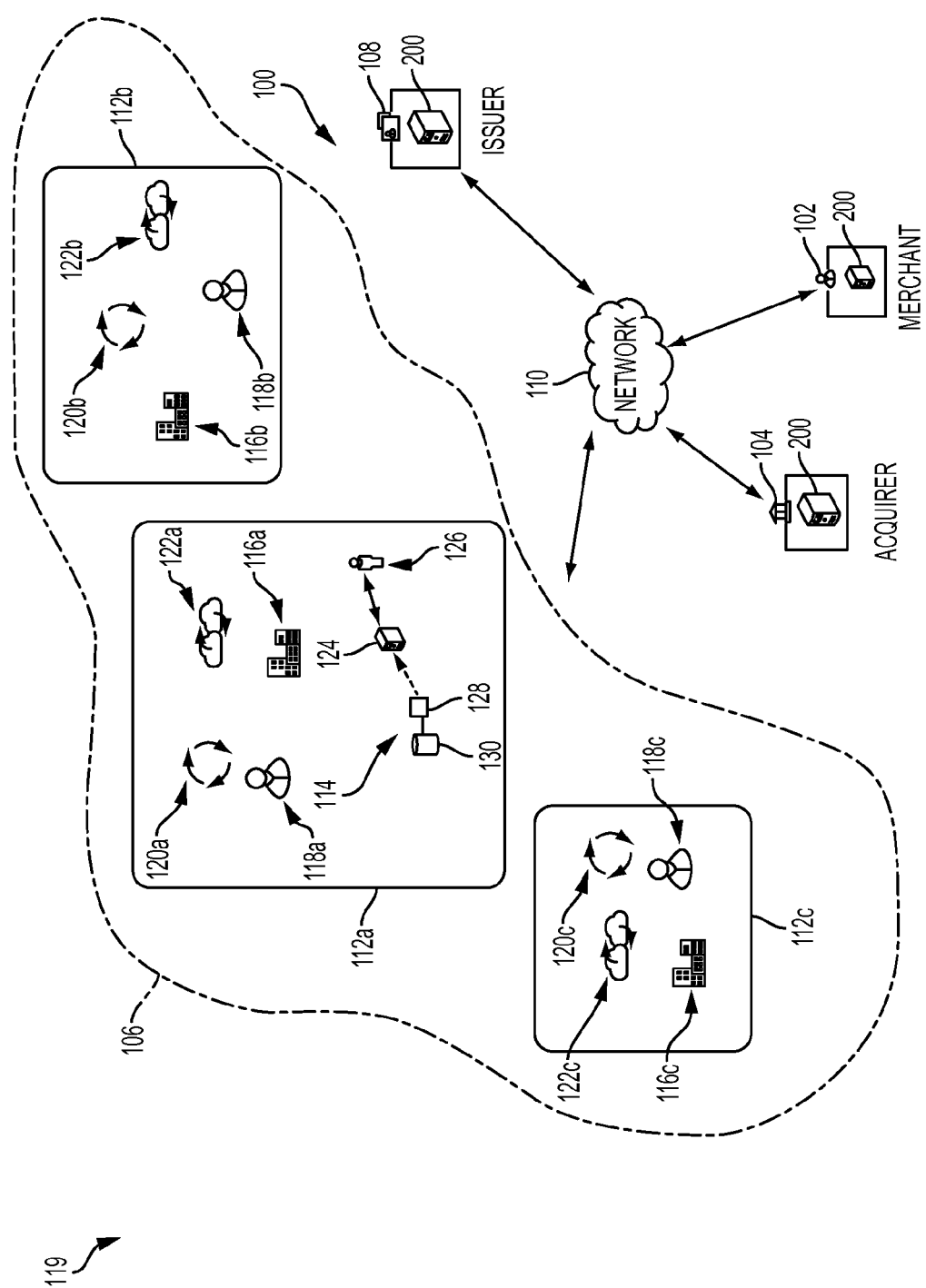
FIG. 1 is a block diagram of an exemplary system of the present disclosure suitable for use in assigning cyber preparedness scores to business entities associated with a payment network.

FIG. 1 illustrates an exemplary system 100, in which one or more aspects of the present disclosure may be implemented. Although the system 100 is presented in one arrangement, other embodiments may include systems arranged otherwise within the scope of the present disclosure.

The system 100 generally includes a merchant 102, an acquirer 104, a payment network 106, and an issuer 108, each coupled to network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, a public network such as the Internet, through which the merchant 102 may connect to the payment network 106 and/or the acquirer 104.

Generally in the system 100, a consumer (not shown) completes purchase transactions for products with the merchant 102 (and with other merchants) using a payment account associated with the consumer. In particular, the consumer may initiate a transaction by presenting a payment device to the merchant 102, for example. The merchant 102, in turn, reads the payment device and/or otherwise receives payment account information from the consumer, and then communicates an authorization request to the acquirer 104 to determine (in conjunction with the issuer 108) whether the consumer's payment account is in good standing and whether there is sufficient credit/funds to complete the transaction. The acquirer 104, in turn, communicates the authorization request with the issuer 108, through the payment network 106 (e.g., MasterCard®, VISA®, Discover®, American Express®, etc.). If the issuer 108 accepts the transaction, a reply authorizing the transaction is provided back to the merchant 102, thereby permitting the merchant 102 to complete the transaction. The transaction is later cleared and/or settled by and between the merchant 102, the acquirer 104, and the issuer 108. Alternatively, if the issuer 108 declines the transaction, a reply declining the transaction is provided back to the merchant 102, thereby permitting the merchant 102 to stop the transaction.

Transaction data is generated, collected, and stored as part of the above interactions among the merchant 102, the acquirer 104, the payment network 106, the issuer 108, and the consumer. The transaction data represents at least a plurality of transactions, e.g., completed transactions, attempted transactions, etc. The transaction data, in this exemplary embodiment, is stored at least by the payment network 106 (e.g., in a data structure associated with the payment network 106, etc.). In other embodiments, transaction data may additionally (or alternatively) be stored in one or more of the merchant 102, the acquirer 104, and/or the issuer 108 (e.g., in a data structure associated with the corresponding entity, etc.).

With continued reference to FIG. 1, the payment network 106 includes multiple business entities 112 (broadly, entities) that help facilitate (or are part of) the transactions described above, as well as other transactions and operations. The payment network 106 provides services, including transaction services, as described above, to the merchant 102, the acquirer 104, the issuer 108, and various other entities (not shown). The services may include, for example, services directed to facilitating payment account transactions, services related to the handling and/or analysis of transaction data, or other services related to transaction data, transactions, consumer payment accounts, consumer purchasing behaviors, etc. As can be appreciated, the payment network's services may be provided over a wide geographic region. This, in combination with the potential number and/or complexity of services, results in the payment network 106 being separated into, or utilizing, the business entities 112 (i.e., parts) either by location or by services, or by both or by other factors, to help the payment network 106 accommodate the merchant 102, the acquirer 104, the issuer 108, and various other entities (not shown) as needed.

In particular in the system 100, the payment network 106 is separated into three business entities 112a-c (however, it could be separated into more or less within the scope of the present disclosure). One of the business entities 112a-c, for example, may provide all payment network services to a particular geographic region, while another of the business entities 112a-c may be limited to bill pay or marketing services but may provide the services to multiple regions. In another example, a business entity may be defined in the context of capturing metric-lead data (for a cyber-security program, etc.) for a recent merger and acquisition by the payment network 106, i.e., the purchased and/or merged part. Or, a business entity may be defined as a target of a specific cyber-security program, such as, for example, "insider threat" pertaining to tracking/monitoring activity of malicious insiders, etc. In addition, the business entities 112a-c may be defined otherwise when, for example, they becomes part of the payment network 106 by acquisition or by other business arrangements, etc. Further, while the business entities 112a-c are illustrated as separate entities in FIG. 1, indicating geographic distinction, it should be appreciated that the business entities 112a-c may be geographically related but still distinct based on services or other factors supported. For example, business entities 112a and 112c may share a building. However, the two business entities 112a and 112c may provide different services, or belong to different business units within the payment network 106, or may otherwise be distinct in the payment network 106 (i.e., the business entities 112, in general, should not be considered limited by location or service).

As indicated, a business entity, as used herein, may include any suitable entity having a relationship with the payment network 106 including, for example, parts of acquirers (e.g., part of acquirer 104, etc.), parts of issuers (e.g., part of issuer 108, etc.), etc. What's more, the relationship may include an existing relationship with the payment network 106, or it may include a potential relationship.

Regardless of the manner in which the business entities 112a-c are located, divided and/or added to the payment network 106, the business entities 112a-c provide access points, or potential access points, to/for the payment network 106. As such, the business entities 112a-c employ security measures to ensure the integrity and security of transaction data, and any other data, contained in the payment network 106 and, in particular, at the business entities 112a-c. In one facet, the security measures are related to the ability of the business entities 112a-c to address network attacks or "cyber" attacks by one or more entities (e.g., individuals, organized crime groups, etc.), aimed at causing issues within the payment network 106 or at gaining access to data within the payment network 106. The security measures related to such attacks are often coordinated through a security entity 114, for example, which may be specific to each of the business entities 112a-c, or which may be general to multiple or all of the business entities 112a-c. In the system 100, security entity 114 is associated with each of the business entities 112a-c. The security entity 114 is then configured to provide policies and/or rules for the implementation of security measures at each of the business entities 112a-c.

For each of the business entities 112a-c in the system 100, security measures exist in four aspects (although this number of aspects is not required in all embodiments, and may be more or less). The aspects include real estate and assets 116 (broadly, assets), people 118, processes 120, and technology 122. For example, asset security measures may include assets available to collect and store evidence of an attack. People security measures may include the number of personnel available to regularly identify vulnerabilities, or the number of people trained to perform incident management. Process security measures may include whether processes are defined to regularly analyze threat reports, or restore a distracter recovery facility, in response to an attack. And, technology security measures may include whether technology is deployed to collect, consolidate, and automate threat intelligence analysis, or whether technology defines which computing devices are available to perform business recovery during an attack.

In addition, the security measure may be directed to different stages of an attack on the payment network 106 or, specifically, on one or more of the business entities 112a-c. For example, certain security measures may be directed to prevention, which are to be implemented by the business entities 112a-c prior to an attack. Other security measures may be directed to detection at the business entities 112a-c, once an attack has occurred. Still other security measures may be directed to response of the business entities 112a-c, after the attack has been detected.

At this point, it should be appreciated that security measures, even when related to the same aspect (e.g., to assets, people, processes, or technology, etc.), may still be different depending on the stage to which they are directed. It should also be appreciated that security measures are generally separated, as described above for purposes of illustration, into different aspects and stages. However, the number of aspects and stages into which the security measures may be separated is not limited to four aspects and three stages, as described herein, but may be more or less in other embodiments. Further, use of aspects and stages to separate security measures should not be considered a limitation or requirement in all embodiments.

Figure 2:
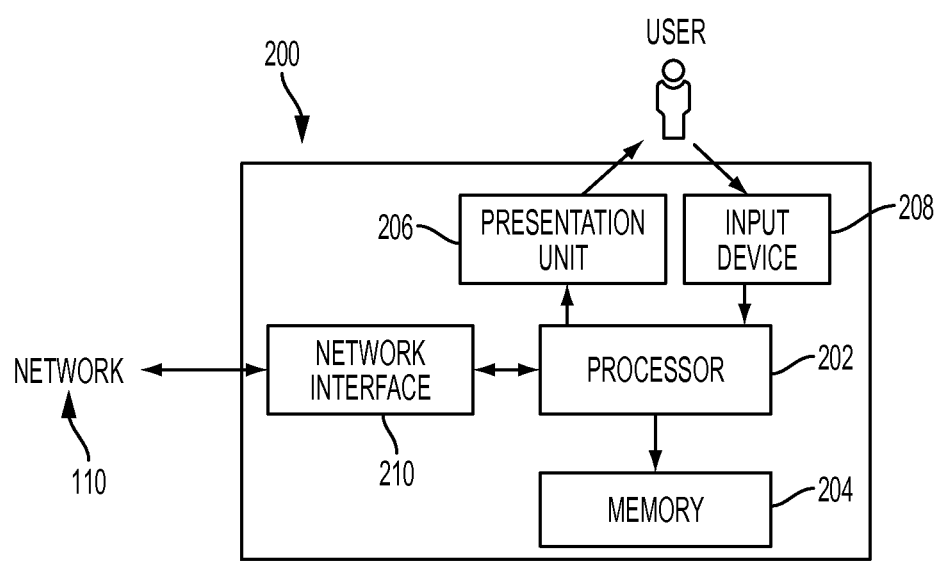
FIG. 2 is a block diagram of a computing device, that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. The computing device 200 may also include a single computing device, or it may include multiple computing devices located in close proximity or distributed over a geographic region, so long as the computing devices are specifically configured to function as described herein. In addition, while not illustrated, it should be appreciated that the payment network 106 may be implemented in, or associated with, at least one computing device consistent with computing device 200.

As shown, the exemplary computing device 200 includes a processor 202 and a memory 204 coupled to the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, applications, application profiles, security aspects, interfaces, security standards, data clarifications, scores, indexes, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiency and/or performance of the processor 202 that is scoring entities in connection with their preparedness for security attacks. It should be appreciated that the memory 204 may include a variety of different memories, each implemented in one or more of the functions or processes described herein.

In the exemplary embodiment, the computing device 200 includes a presentation unit 206 that is coupled to the processor 202 (however, it should be appreciated that the computing device 200 could include output devices other than the presentation unit 206, etc.). The presentation unit 206 outputs information (e.g., score indexes for applications, interfaces soliciting security aspects, etc.), either visually or audibly to a user of the computing device 200. It should be further appreciated that various web-based interfaces (e.g., application interfaces, webpages, etc.) may be displayed at computing device 200, and in particular at presentation unit 206, to display information to the user. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, indicating one or more security aspects of applications, etc. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, as indicated above, the security entity 114 provides policies and/or rules for the implementation of (and the content of) security measures for the payment network 106. The security entity 114 may include a variety of personnel, computing devices, etc. In the payment network 106, for purposes of illustration, the security entity 114 includes computing device 124 and user 126. However, it should be appreciated that the security entity 114 may include more than one computing device and/or user in other embodiments, and oftentimes multiple ones of each. The computing device 124 is generally consistent with the computing device 200 of FIG. 2. The user 126 then has access to the computing device 124. The user 126 may include an analyst, an information services (IS) person, an information technology (IT) person, or other individual associated with and/or employed by the payment network 106 to create, coordinate, and/or implement security measures.

The security entity 114, through the user 126, works to ensure that proper security measures are in place at each of the business entities 112a-c (and at any new entities), upon their inclusion with the payment network 106 and at regular or irregular intervals thereafter (e.g., as quality control measures, maintenance, as necessary updates, etc.). The security entity 114, in particular, audits different ones of the business entities 112a-c to determine the preparedness of the audited business entities 112a-c for one or more cyber-attacks (or network attacks). Such attacks may include, without limitation, data breaches, installation of destructive malware, data theft, etc. To aid in this determination, uniquely, the security entity 114 includes a security engine 128, which is specifically configured, often by executable instructions, to generate a preparedness score for each of the business entities 112*a-c*. The security engine 128 may be included in the computing device 124 (as indicated by the dotted arrow in FIG. 1), or in another computing device associated with the business entity 112*a* (or with one of the other business entities 112*b-c*), or the security engine 128 may be a standalone entity in the system 100 in other embodiments.

Generally, for each of the business entities 112*a-c*, security measures are in place, or have been implemented, in connection with the three stages of an attack: prevention, detection and response. Each of the security measures, for each of the business entities 112*a-c*, is indicated in a security profile for each of the business entities 112*a-c* that is stored in data structure 130 of the security entity 114. Other information regarding the existence of and/or implementation of security measures, at the business entities 112*a-c*, may further be gathered by the user 126 directly or indirectly. In at least one embodiment, the security measures, as relied on by the security engine 128 in auditing the business entities 112*a-c*, are simply verified by the user 126 and are not necessarily retrieved as part of a security profile.

Once each of the implemented security measures is identified for an entity, e.g., business entity 112*a* in the following discussion, the security engine 128 assigns a partial score to the business entity 112*a* for each of the aspects (e.g., assets, people, process, technology, etc.) of the security measures, and for each of the stages (e.g., prevention, detection and response). The score may be based on a variety of metrics, scales, benchmarks, etc. In one or more examples, the security engine 128 assigns the scores based on an assessment and/or scoring of the aspect/stage by the user 126. The security engine 126 sums the scores, per stage (or sub-stage if applicable), to yield a sub-score. The sub-scores for each of the stages are then weighted according to, for example, relative importance, impact of preparedness, etc., and combined to yield the preparedness score for the business entity 112*a*. This will be described in more detail in connection with method 300.

Once the preparedness score is generated by the security engine 128 for the business entity 112*a*, the security engine 128 publishes it in one or more manners, for example, for review by the user 126, for reporting within the security entity 114, etc., or, more generally, within the payment network 106 for subsequent use. In response, the security entity 114 may implement and/or revise security measures in the business entity 112*a*, and/or allocate resources accordingly based on the relative preparedness scores of the other business entities 112*b-c* (or other entities not shown). In various aspects, the preparedness score may be published by the security engine 128 along with the sub-scores (or partial scores), either weighted or unweighted, thereby enabling the user 126 (or other users) to determine whether a particular stage or aspect of the business entity 112*a* is deficient.

While the system 100 is described in connection with the business entities 112*a-c* generally having business relationships to the payment network 106, it should be appreciated that aspects of the present disclosure may equally apply to other entities that do not necessarily have business relationships with the payment network 106, but for whom it may still be desired to generate preparedness scores as described herein.

Figure 3:
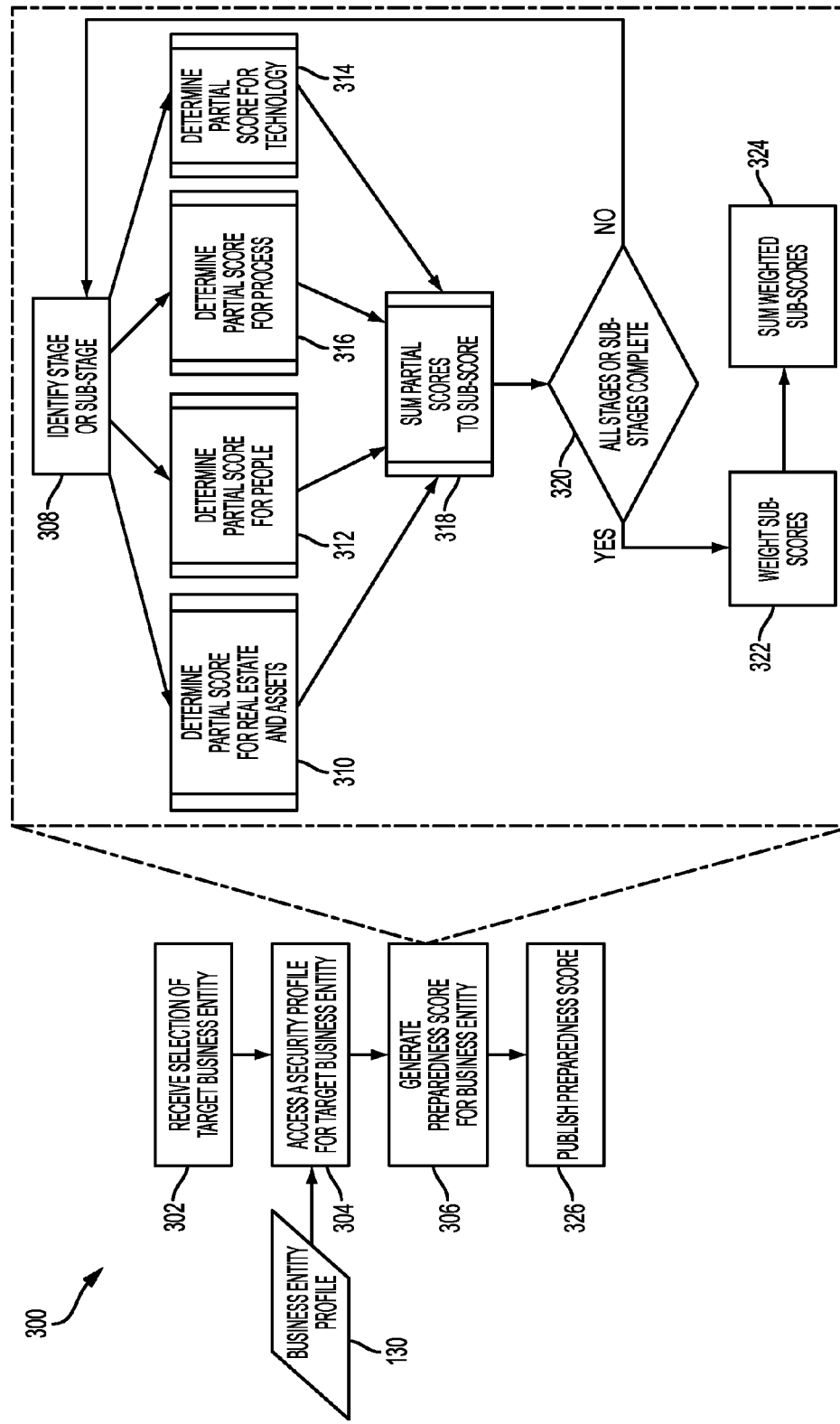
FIG. 3 is an exemplary method for generating a preparedness score for a business entity associated with a payment network, which may be implemented in the system of FIG. 1.

FIG. 3 illustrates an exemplary method 300 for assigning a score to a business entity associated with a payment network (or other entity), based on one or more security measures, as an indicator of cyber preparedness of the business entity. The exemplary method 300 is described as implemented in the security engine 128 of the system 100, and with additional reference to the security entity 114 and payment network 106. However, the method 300 is not limited to the security engine 128, or to the system 100, and, as such, may be implemented in other entities of the payment network 106, or more generally, in other parts of system 100 or in other systems. Further, for purposes of illustration, the exemplary method 300 is described herein with reference to the computing device 200. The methods herein should not be understood to be limited to the exemplary system 100 or the exemplary computing device 200, and likewise, the systems and the computing devices herein should not be understood to be limited to the exemplary method 300.

Generally, as part of an audit of the security, or cyber readiness, of the business entities 112*a-c*, either regularly or irregularly (or initially when a business entity associates with the payment network 106 for the first time), the user 126 of the security entity 114 may invoke the security engine 128 to generate a preparedness score for any one or more of the business entities 112*a-c*. In this manner, vulnerabilities of the business entities 112*a-c* may be assessed and/or determined, and modified/improved as needed, in advance of any cyber-attacks on the business entities 112*a-c* or, more generally, on the payment network 106.

In connection therewith, at 302 in the method 300, the security engine 128 initially receives a selection of a business entity, for example, business entity 112*a* in the following description (i.e., a target business entity or, broadly, a target entity), to be evaluated. In turn, the security engine 128 accesses a security profile for the business entity 112*a*, at 304, in data structure 130 of the security entity 114. The data structure 130, as described above, includes various security profiles for the different business entities 112*a-c* in the system 100, including business entity 112*a*, that indicate, for example, numbers, types, degrees, versions and/or other facts about security measures implemented at the business entities 112*a-c*. Such details may be provided directly by the business entities 112*a-c*, or may be populated by the security entity 114 upon initial (or subsequent) review. In addition to the data structure 130, the security engine 128 may, in some embodiments, rely on information provided by the user 126, for example, interpreting information from the data structure 130 or indicating such facts about security measures for the business entity 112*a*.

The security engine 128 then generates a preparedness score for the business entity 112*a*, at 306. In particular, the security engine 128 determines a number of partial scores and sub-scores for the business entity 112*a*, as will be described next, in connection with the various different aspects and stages of the business entity's implemented security measures.

As shown in FIG. 3, in connection with generating the preparedness score for the business entity 112*a* in the method 300, the security engine 128 initially identifies a stage, or a sub-stage where present or available, for score generation, at 308, and then determines a partial score for each identified stage (or sub-stage) for each applicable security measure aspect, at 310-316. After each partial score is determined for an identified stage (or sub-stage), for each aspect, the security engine 128 sums the partial scores, at 318, to determine a sub-score for the stage (or sub-stage). The security engine 128 then determines if all of the stages (and/or sub-stages) are complete, at 320. When another stage (or sub-stage) remains, the security engine 128 returns to operation 308 and identifies one of the remaining stages (and/or sub-stages), performs the remaining necessary ones of the operations 310-316, and then again sums the partial scores, at 318, to determine a sub-score for the particular stage (or sub-stage). It should be appreciated that other operations may be used in addition to, or in place of, those illustrated herein for generating a preparedness score for an entity in other embodiments. For example, additional operations may be used if additional stages, sub-stages, or aspects are present, etc.

FIGS. 4A-4B illustrate an exemplary rule matrix 400 for the three stages discussed herein (i.e., prevention, detection, and response) for each of the four aspects discussed herein (i.e., real estate and assets, people, process, technology), as associated with security measures for business entity 112a. In this matrix 400, the three stages each have sub-stages 402. For example, the prevention stage includes a vulnerability management sub-stage, a threat intelligence sub-stage, and a subsidiary security sub-stage. The detection stage includes an event management sub-stage. And, the response stage includes an incident management sub-stage, a business recovery sub-stage, and a disaster recovery sub-stage.

FIGS. 4A-4B also illustrate rules to be used by the security engine 128 for determining a partial score for each of the identified sub-stages, for each of the aspects (e.g., at operations 310-316 in method 300, etc.), for the illustrated matrix 400. In particular, the rules define particular criteria that, when satisfied, indicate the partial score to be assigned. In the exemplary rule matrix 400, subjective metrics (or ratings) are used to determine "High," "Medium," and "Low" evaluations for the identified sub-stages. Then, in connection with scoring the sub-stages (i.e., in determining a partial score for the sub-stages), a value of "6" is assigned for a "High" evaluation; a value of "3" is assigned for a "Medium" evaluation; and a value of "1" is assigned for a "Low" evaluation. In other embodiments, objective metrics may be used to assign the scores, or may be used in connection with the initial evaluations.

Table 1 illustrates partial scores determined by the security engine 128 for the multiple sub-stages identified in FIGS. 4A-4B for the business entity 112a, for each of the four aspects discussed herein. The partial scores include both the subjective metrics for each sub-stage and the corresponding numerical value/partial score.

TABLE 1

|  |  | Real Estate and Assets |  | People |  | Process |  | Technology |  |
|---|---|---|---|---|---|---|---|---|---|
| Prevention | Vulnerability Management | 6 | High | 6 | High | 3 | Med | 6 | High |
|  | Threat Intelligence | 6 | High | 6 | High | 3 | Med | 6 | High |
|  | Subsidiary Security | 6 | High | 6 | High | 3 | Med | 6 | High |
| Detection | Event Management | 6 | High | 6 | High | 6 | High | 6 | High |
| Response | Incident Management | 6 | High | 6 | High | 3 | Med | 3 | Med |
|  | Business Recovery | 6 | High | 6 | High | 6 | High | 3 | Med |
|  | Disaster Recovery | 6 | High | 6 | High | 3 | Med | 3 | Med |

Table 2 then illustrates sub-scores for each of the multiple sub-stages identified in FIGS. 4A-4B for the business entity 112a, based on a sum of the numerical values/partial scores (from Table 1) for each of the four aspects, as determined by the security engine 128. Table 2 also illustrates a final preparedness score (as discussed in more detail below) for the business entity 112a for this example.

TABLE 2

| Stage | Sub-Stage | Sub-Score | Normalized Sub-score | Weight % | Weighted Sub-Score % | Preparedness Score |
|---|---|---|---|---|---|---|
| Prevention | Vulnerability Management | 21 | 8.7 | 30% | 26% | 9 |
|  | Threat Intelligence | 21 | 8.7 | 15% | 13% |  |
|  | Subsidiary Security | 21 | 8.8 | 10% | 9% |  |
| Detection | Event Management | 24 | 10 | 30% | 30% |  |
| Response | Incident Management | 18 | 7.5 | 5% | 4% |  |
|  | Business Recovery | 21 | 8.8 | 5% | 4% |  |
|  | Disaster Recovery | 18 | 7.5 | 5% | 4% |  |

With additional reference again to FIG. 3, in connection with exemplary rule matrix 400, at 308, the security engine 128 may identify the vulnerability management sub-stage and then proceed, at 310, to determine a partial score for the real estate and assets aspect. The security engine 128 relies on the rules contained in FIGS. 4A-4B to determine the partial score. In particular, in the rule matrix 400, the business entity 112a includes 67% of its real estate and assets scanned for vulnerability. As such, the security engine 128 determines (based on the rules in FIGS. 4A-4B) that the business entity 112a satisfies the "High" benchmark, and assigns a partial score of "6" for the real estate and assets aspect at the vulnerability management sub-stage, as indicated in Table 1. Subsequently, or in parallel, the security engine 128 further determines/assigns a partial score for the vulnerability management sub-stage, based on the rules contained in FIGS. 4A-B, in connection with the people aspect at 312, the technology aspect at 314, and the process aspect at 316. With regard to the people aspect, the security engine 128 identifies that a superior number of people are allocated at the business entity 112a. As such, the security engine 128 determines that the business entity 112a satisfies the "High" benchmark, and assigns a partial score of "6" for the people aspect at the vulnerability management sub-stage, as indicated in Table 1. With regard to the technology aspect, the security engine 128 identifies that a high level of technology is available to scan and identify potential vulnerabilities at the business entity 112a. As such, the security engine 128 determines that the business entity 112a satisfies the "High" benchmark, and assigns a partial score of "6" for the technology aspect at the vulnerability management sub-stage, as indicated in Table 1. And with regard to the process aspect, the security engine 128 identifies that a medium number of processes are defined to regularly identify potential vulnerabilities in the business entity 112a. As such, the security engine 128 determines that the business entity 112a satisfies the "Medium" benchmark, and assigns a partial score of "3" for the process aspect at the vulnerability management sub-stage, as indicated in Table 1.

The security engine 128 then sums each of the partial scores for the vulnerability management sub-stage, to determine a sub-score for the vulnerability management sub-stage of 21, as shown in Table 2.

Once the sub-score for the vulnerability management sub-stage is determined, the security engine 128 determines that additional sub-stages still need to be scored for the prevention stage (i.e., a threat (or cyber) intelligence sub-stage of the prevention stage and a subsidiary security sub-stage of the prevention stage, etc.), the detection stage (i.e., the event management sub-stage), and the response stage (i.e., the incident management sub-stage, the business recovery sub-stage, and the disaster recovery sub-stage). As such, the security engine 128 repeats the above process (including operations 308-318) to determine partial scores (based on the rules in FIGS. 4A-4B) and sub-scores for each of the remaining sub-stages, for each of the remaining stages. The exemplary results for these remaining determinations are also shown in Tables 1 and 2.

In some embodiments, the security engine 128 may receive a metric (or rating) for one or more of the security measures, of the business entity 112a, from the user 126 (or from another user). The security engine 128 may then use the rating to determine one or more corresponding sub-scores. For example, the user 126 may specify that one of the sub-stages in FIGS. 4A-4B has one of a "High," "Medium," or "Low" evaluation, and then assign a corresponding value of "6," "3," or "1," as described above (and, for example, independent of the rules indicated in FIGS. 4A-4B).

With continued reference to FIG. 3, when all stages (and/or sub-stages) are complete, e.g., when sub-scores have been determined for all sub-stages (for all stages) as in Tables 1 and 2, the security engine 128 weights the sub-scores, at 322. As can be appreciated, different stages/sub-stages may be more or less indicative of preparedness of the business entity 112a as it relates to a cyber-attack. To ensure that less important, or less impactful, sub-stages or stages do not overly impact or skew the preparedness score, the sub-scores are weighted, in this exemplary embodiment. The security engine 128 then sums the weighted sub-scores, at 324, as the preparedness score for the business entity 112a.

In the above example, Table 2 further illustrates weighted scores for the exemplary partial scores from Table 1 for the business entity 112a. In connection with weighting the sub-scores, the sub-scores are each initially normalized by the security engine 128 to a predefined scale of 0-10, based on a maximum possible sub-score of 24 (i.e., (sub-score/24)*10=normalized sub-score). It should be appreciated that a variety of different normalization techniques, and/or different ranges and/or scales, may be used in conjunction with other method embodiments.

As also shown in Table 2, once each of the sub-scores are normalized, the security engine 128 weights the sub-scores, by a desired percentage (e.g., a weight percentage, etc.). In so doing, the desired percentage applied to each of the sub-scores is indicative of a relative impact of each of the sub-scores on the resulting preparedness score (e.g., as determined by the engine 128, based on historical data, etc.). In this example, the security engine 128 defines the weight percentage as the fraction the particular sub-stage contributes to the preparedness score (such that all of the assigned weight percentages add up to 100 percent). As shown, the vulnerability management sub-score/sub-stage accounts for 30% of the preparedness score, while the incident management sub-score/sub-stage accounts for only 5% of the preparedness score (such that the vulnerability management sub-score, in this embodiment, is considered to have a greater impact on the resulting preparedness of the business entity 112a than the incident management sub-score). The sub-scores are then multiplied by the respective weight percentages (and divided by ten in this example), to yield the weighted sub-score percentage. And, the weighted sub-score percentages are summed by the security engine 128, and again normalized to a scale of 0-10 (e.g., by dividing the sum by ten, etc.), to provide the preparedness score for the business entity 112a. In this example, the business entity 112a has a preparedness score of "9".

It should be appreciated that if an additional business entity is acquired by the payment network 106, and is to be added to the security engine 128, a redistribution of weighting and sub-score calculations would be required, where each would account for 100% of the overall possible preparedness score and supporting calculations (such that the multiple businesses entity are generally taken into account together).

It should also be appreciated that a variety of variations may be employed to the above example, provided with reference to FIGS. 4A-4B and Tables 1 and 2, and such variations should be understood to be within the scope of the present disclosure. For example, partial scores may be determined for less than all aspects of the business entity 112a, or for other different aspects of the business entity 112a. For example, the user 126 may only request a preparedness score for the prevention stage, or for the detection stage, or for a different stage. Further, the security engine 128 may generate sub-scores for less than each sub-stage, for less than each stage, or for less than each aspect, and/or may generate sub-scores for other stages, other sub-stages, or other aspects in different method embodiments. Further still, weighting may be applied to the partial scores, prior to the partial scores being summed into the sub-score. Moreover, additional normalization and/or weighting techniques may be employed at various stages of the method 300 as desired.

With further reference again to FIG. 3, once the security engine 128 generates the preparedness score for the business entity 112a, the security engine 128 publishes the score, at 326. As previously described, the preparedness score can be published in a variety of different manners. For example, the security engine 128 may publish the preparedness score for review by the user 126, for reporting within the security entity 114, etc., or, more generally, within the payment network 106 for subsequent use. In one or more other embodiments, the security engine 128 may publish the preparedness score, and any sub-scores and/or partial scores, as desired, by storing the score(s) in the data structure 130, or by transmitting the score(s) to one or more entities and/or person(s) within the payment network 106, or outside the payment network 106. The published scores can then be used, for example, to provide numerical depictions of the improvement and/or regression of the represented "readiness" for the business entity 112a (and/or the other business entities 112b-c and/or other business entities of the payment network 106), which may accounts for the overall enterprise "Cyber Readiness" within the payment network 106 and system 100.

Figure 5:
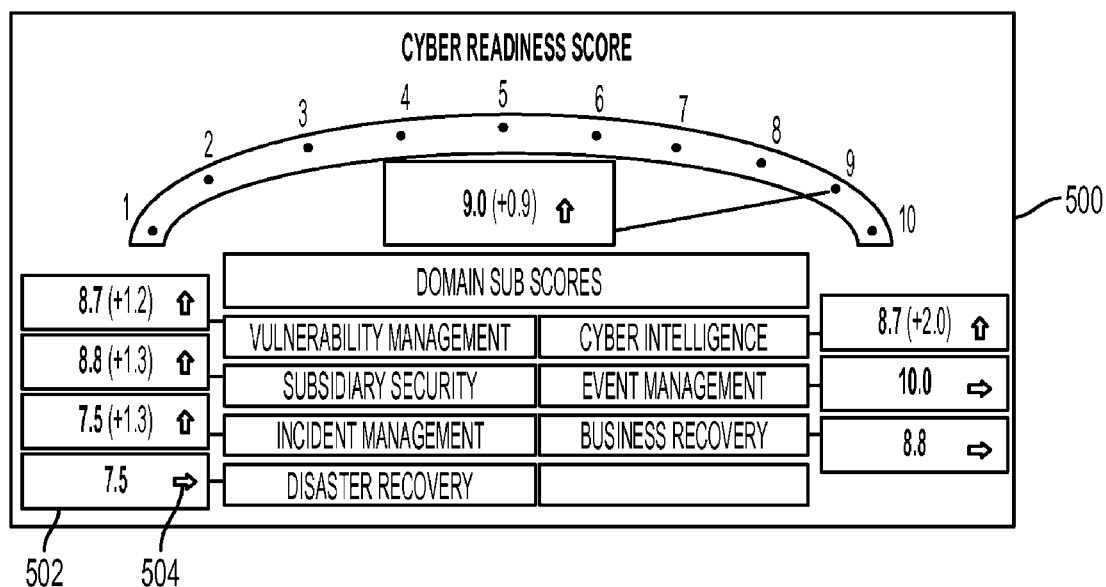
FIG. 5 is an exemplary interface indicating a preparedness score that may be published in connection with the system of FIG. 1 and/or the method of FIG. 3.

FIG. 5 illustrates an exemplary interface 500 that may be used by the security engine 128 in connection with publishing the preparedness score for the business entity 112a. The interface 500 may be generated by the security engine 128 and displayed (broadly published) to the user 126 at the computing device 124. In so doing, the preparedness score of "9.0" (from the above example) is indicated. In the interface 500, the preparedness score is provided as a numerical value, as well as in a gauge arrangement on a scale of 1-10 (with a needle of the gauge then pointing to the generated preparedness score). Also in the interface 500, the scale of the gauge may be color coded to identify different thresholds (e.g., "failed," "acceptable", "pass," "good," etc.) by different colors (e.g., shading gradations ranging from red to yellow to green for corresponding "failed,", "acceptable,"

"pass," and "good" thresholds; etc.), so that the user 126 can quickly and easily see/recognize the status of the business entity 112*a*.

In addition to the preparedness score, the exemplary interface 500 also indicates the various sub-scores, at 502, for example, for each of the sub-stages of the business entity 112*a* used in generating the preparedness score.

Further in the interface 500, the security engine 128 may calculate and/or otherwise determine, and then display, trending data to be published to the user 126 or others. In so doing, the interface 500, for example, includes arrows 504 (broadly, indicators) for each of the sub-scores 502 to visually indicate that the particular sub-score has gone up, gone down, or stayed the same since a prior preparedness score was generated. In particular in the interface 500, following generation of the current preparedness score, the sub-score for vulnerability management is indicated as having increased 1.2 points since a last sub-score was generated. And, the preparedness score is indicated as having increased 0.9 points since it was last generated. It should be appreciated that other trending data, as compared to a prior generated preparedness score (or to multiple prior preparedness scores) or sub-score(s), may be included in one or more other interface embodiments. Moreover, weighting percentages and/or score determination rules may be indicated in the interface in various embodiments, as well as partial scores, per aspect of the business entity 112*a*.

In this manner, through the systems and methods herein, users associated with security entities, and more generally, payment networks associated therewith, are able to identify aspects and/or stages (or sub-stages) of security measures at business entities that may need to be updated, revised, and/or otherwise modified. In addition, the preparedness scores described herein (for use in making such determinations), when compared across multiple business entities, may permit the security entities (whether responsible for one business entity or multiple or all business entities) to determine manners in which resources should to be allocated to address deficiency and/or to enhance preparedness of each individual business entity, and all of the business entities together, to help protect not only the business entities buy also the payment networks.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a selection of a target entity of a payment network; (b) generating a preparedness score related to cyber-attack for the entity, based on at least one security aspect of the entity, and at least one stage of attack; and (c) publishing the preparedness score to a user.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in scoring a business entity, associated with a payment network, for preparedness in connection with one or more cyber-attacks on the business entity and/or the payment network, the system comprising at least one computing device configured, by executable instructions, to:
    receive, by the at least one computing device, a selection of a business entity associated with a payment network;
    generate, by the at least one computing device, multiple sub-scores for at least one cyber-security measure associated with the business entity, wherein:
        each of the multiple sub-scores is generated based on at least two partial scores, each partial score based on one aspect selected from the group consisting of: assets of the business entity, people at the business entity, at least one process of the business entity, and a technology associated with the business entity;
        each of the multiple sub-scores is directed to different stages of a cyber-attack; and
        one of the multiple sub-scores is associated with a prevention stage and a different one of the multiple sub-scores associated with a detection stage;
    weight, by the at least one computing device, each sub-score based on a weight percentage, wherein the weight percentage is indicative of a relative impact of said sub-score on preparedness of the business entity in connection with the cyber-attack;
    combine, by the at least one computing device, the multiple weighted sub-scores into a preparedness score; and
    publish, by the at least one computing device, the preparedness score to a user.

2. The system of claim 1, wherein the weight percentage is indicative of a relative impact of said sub-score on the preparedness score, based on multiple different business entities associated with the payment network.

3. The system of claim 1, wherein the at least one computing device is further configured, by the executable instructions, to:
    receive, by the at least one computing device, a rating for the at least one cyber-security measure of the business entity employed in the prevention stage from the user; and
    generate, by the at least one computing device, the one of the multiple sub-scores associated with the prevention stage further based on the rating.

4. A computer-implemented method for use in scoring an entity for preparedness in connection with one or more attacks, the method comprising:
    receiving a selection of a target entity of a payment network;
    generating, by a computing device, a first sub-score based on at least one security aspect of the target entity, the first sub score indicative of security measures employed by the target entity in a prevention stage;
    generating, by the computing device, a second sub-score, the second sub-score indicative of security measures employed by the target entity in a detection stage;
    generating, by the computing device, a third sub-score, the third sub-score indicative of security measures employed by the target entity in a response stage;
    combining, by the computing device, the first, the second, and the third sub-scores into a preparedness score related to a cyber-attack for the target entity; and
    publishing, by the computing device, the preparedness score for the target entity to a user.

5. The method of claim 4, wherein the at least one security aspect includes two or more security aspects selected from the group consisting of: assets of the target entity, people at the target entity, at least one process of the target entity, and a technology associated with the target entity.

6. The method of claim 4, wherein generating the first sub-score includes generating the first sub-score based on vulnerability management, threat intelligence, and entity security sub-stages.

7. The method of claim 4, wherein generating the third sub-score includes generating the third sub-score based on incident management, business recovery, and disaster recovery sub-stages.

8. The method of claim 4, wherein the at least one security aspect of the target entity include assets of the target entity, people at the target entity, at least one process of the target entity, and a technology associated with the target entity; and
    wherein each of generating the first, second, and third sub-scores includes generating a partial score for the at least one security aspect of the target entity and summing each of the partial scores.

9. The method of claim 4, further comprising assigning, by the computing device, a weight to each of the first, second, and third sub-scores; and
    wherein combining the first, the second, and the third sub-scores into the preparedness score includes combining the weighted first, second, and third sub-scores into the preparedness score.

10. The method of claim 9, further comprising normalizing, by the computing device, the preparedness score to a predefined scale, prior to publishing the preparedness score for the target entity to the user.

11. The method of claim 4, wherein publishing the preparedness score includes causing the preparedness score to be displayed at a computing device associated with the user, as an indicator, relative to at least one threshold.

12. A non-transitory computer-readable storage media including executable instructions that, when executed by at least one processor, cause the at least one processor to:
    generate a first sub-score for an entity based on multiple aspects of the entity, the first sub-score directed to a first stage of a cyber-attack;
    generate a second sub-score for the entity based on the multiple aspects of the entity, the second sub-score directed to a second, different stage of a cyber-attack;
    generate a third sub-score for the entity based on the multiple aspects of the entity, the third sub-score directed to a third stage of a cyber-attack, the third stage being different than the first and second stages;
    weight at least one of the first sub-score and the second sub-score, based on a relative importance of the first stage to the second stage;
    generate, based on the first, second, and third sub-scores, a preparedness score for the entity; and
    publish the preparedness score to at least one user.

13. The non-transitory computer-readable storage media of claim 12, wherein the first stage includes a prevention stage and the second stage includes one of a detection stage and a response stage.

14. The non-transitory computer-readable storage media of claim 12, wherein the executable instructions, when executed by the at least one processor, cause the at least one processor, in order to generate the first sub-score, to determine a partial score for the first stage, for each of the multiple aspects of the entity, and to combine the multiple partial scores into the first sub-score.

15. The non-transitory computer-readable storage media of claim 12, wherein the executable instructions, when executed by the at least one processor, cause the at least one processor, in order to publish the preparedness score, to store the preparedness score in memory.

16. The non-transitory computer-readable storage media of claim 12, wherein the executable instructions, when executed by the at least one processor, cause the at least one processor, in order to publish the preparedness score, to cause at least one interface to be displayed to the user, at a computing device associated with the user, the interface including the preparedness score and at least one of the first and the second sub-scores.

17. The non-transitory computer-readable storage media of claim 16, wherein the interface further includes an indicator of a change in the preparedness score, as compared to a last generated preparedness score for the entity.

18. The non-transitory computer-readable storage media of claim 12, wherein the first stage includes one of vulnerability management, threat intelligence, and entity security.

* * * * *